United States Patent
Katrak (10) Patent No.: US 10,283,978 B2
(45) Date of Patent: *May 7, 2019

(54) DIAGNOSTIC SYSTEM FOR A BATTERY SYSTEM

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 159 days.

This patent is subject to a terminal disclaimer.

(21) Appl. No.: 15/607,511

(22) Filed: May 28, 2017

(65) Prior Publication Data

US 2017/0373358 A1 Dec. 28, 2017

Related U.S. Application Data

(60) Provisional application No. 62/354,847, filed on Jun. 27, 2016.

(51) Int. Cl.
*H02J 7/00* (2006.01)
*G06F 13/14* (2006.01)
(Continued)

(52) U.S. Cl.
CPC ............ *H02J 7/0026* (2013.01); *G06F 13/14* (2013.01); *G06F 13/38* (2013.01); *H01M 10/425* (2013.01); *H01M 10/482* (2013.01); *B60R 16/033* (2013.01); *H01M 2010/4278* (2013.01); *H01M 2220/20* (2013.01)

(58) Field of Classification Search
CPC .. H02J 7/0026; H01M 10/425; H01M 10/482; H01M 2010/4278; H01M 2220/20; G06F 13/38; G06F 13/14; B60R 16/033
See application file for complete search history.

(56) References Cited

U.S. PATENT DOCUMENTS

| 5,606,242 A | * | 2/1997 | Hull | ...... | H02J 7/0004 320/106 |
| 6,069,821 A | * | 5/2000 | Jun | ......... | G11C 11/56 365/185.03 |

(Continued)

FOREIGN PATENT DOCUMENTS

| JP | 2009017651 A | 1/2009 |
| JP | 2011027609 A | 2/2011 |

(Continued)

OTHER PUBLICATIONS

U.S. Appl. No. 15/607,506, filed May 28, 2017 entitled Diagnostic System for a Battery System.

(Continued)

*Primary Examiner* — Naum Levin
(74) *Attorney, Agent, or Firm* — Buckert Patent & Trademark Law Firm PC; John F. Buckert (57) ABSTRACT

A diagnostic system for a battery system having a battery module electrically coupled to a contactor is provided. The battery module has first, second, and third battery cells. The diagnostic system includes a first microcontroller that transitions the contactor to an open operational state if a first battery cell comparator overvoltage flag is equal to a first battery cell analog overvoltage flag value, or a battery module fault line voltage flag is equal to a first battery module fault line voltage flag value.

12 Claims, 6 Drawing Sheets

(51) Int. Cl.
*G06F 13/38* (2006.01)
*H01M 10/48* (2006.01)
*H01M 10/42* (2006.01)
*B60R 16/033* (2006.01)

(56) References Cited

U.S. PATENT DOCUMENTS

| | | | | |
|---|---|---|---|---|
| 6,611,774 | B1* | 8/2003 | Zaccaria | G01R 31/3648 320/116 |
| 7,081,737 | B2* | 7/2006 | Liu | H01M 10/441 320/130 |
| 7,714,674 | B2* | 5/2010 | Guo | H03L 1/02 331/109 |
| 7,969,119 | B2* | 6/2011 | Odaohhara | H02J 7/045 320/134 |
| 8,378,868 | B2* | 2/2013 | Lyles | G01R 31/3658 320/134 |
| 9,970,991 | B2* | 5/2018 | Katrak | B60L 11/1851 |
| 2007/0257642 | A1* | 11/2007 | Xiao | H02J 7/0026 320/134 |
| 2009/0009143 | A1 | 1/2009 | Odaohhara | |
| 2009/0021871 | A1* | 1/2009 | Moran | B60K 6/28 361/15 |
| 2011/0025271 | A1 | 2/2011 | Yamamoto et al. | |
| 2013/0017421 | A1* | 1/2013 | Onnerud | B60R 21/01 429/61 |
| 2014/0354242 | A1* | 12/2014 | Tsutsui | H02J 7/0029 320/162 |
| 2015/0130419 | A1* | 5/2015 | Zhai | H02J 7/0073 320/112 |
| 2016/0025815 | A1 | 1/2016 | Baughman | |
| 2017/0373357 | A1* | 12/2017 | Katrak | H01M 10/425 |
| 2017/0373358 | A1* | 12/2017 | Katrak | H01M 10/425 |

FOREIGN PATENT DOCUMENTS

| | | |
|---|---|---|
| JP | 2011127947 A | 6/2011 |
| JP | 2013190258 A | 9/2013 |

OTHER PUBLICATIONS

U.S. Appl. No. 15/607,510, filed May 28, 2017 entitled Diagnostic System for a Battery System.

* cited by examiner

FIG. 1

TABLE - BATTERY CELL COMPARATOR OVERVOLTAGE FLAG VALUES

|  | | BINARY | DECIMAL |
|---|---|---|---|
| 802 | INITIALIZATION VALUE | 0 0 0 | 0 |
| 804 | FIRST BATTERY CELL COMPARATOR OVERVOLTAGE FLAG VALUE | 1 1 0 | 6 |
| 806 | SECOND BATTERY CELL COMPARATOR OVERVOLTAGE FLAG VALUE | 0 1 1 | 3 |
| 808 | THIRD BATTERY CELL COMPARATOR OVERVOLTAGE FLAG VALUE | 1 0 1 | 5 |

TABLE - BATTERY MODULE FAULT LINE VOLTAGE FLAG VALUES

| 821 | INITIALIZATION VALUE | 0000 0000 |
|---|---|---|
| 822 | FIRST BATTERY MODULE FAULT LINE VOLTAGE FLAG VALUE (FAULT) | 1001 0101 |
| 823 | SECOND BATTERY MODULE FAULT LINE VOLTAGE FLAG VALUE (NON-FAULT) | 0101 1001 |

TABLE - BATTERY MODULE NUMBERS

|  | BINARY | DECIMAL |
|---|---|---|
| 831 — FIRST BATTERY MODULE NUMBER | 110 | 6 |
| 832 — SECOND BATTERY MODULE NUMBER | 001 | 1 |
| 833 — THIRD BATTERY MODULE NUMBER | 100 | 4 |
| 834 — FOURTH BATTERY MODULE NUMBER | 111 | 7 |

TABLE - EXEMPLARY STORED DIAGNOSTIC INFORMATION

| BATTERY CELL COMPARATOR OVERVOLTAGE FLAG VALUE | BATTERY MODULE NUMBER |
|---|---|
| 851 — 110 | 110 |
| 852 — 011 | 110 |
| 853 — 101 | 110 |

DIAGNOSTIC SYSTEM FOR A BATTERY SYSTEM

CROSS-REFERENCE TO RELATED APPLICATION

This application claims priority to U.S. Provisional Patent Application No. 62/354,847 filed on Jun. 27, 2016, the entire contents of which are hereby incorporated by reference herein.

BACKGROUND

The inventor herein has recognized a need for a diagnostic system for a battery system that utilizes two independent types of flags (i.e., battery cell comparator overvoltage flags and a battery module fault line voltage flag) to have diagnostic diversity to determine when a contactor electrically coupled to a battery module is to be transitioned to an open operational state.

SUMMARY

A diagnostic system for a battery system in accordance with an exemplary embodiment is provided. The battery system has a battery module electrically coupled to a contactor. The battery module has first, second, and third battery cells. The diagnostic system includes a first microcontroller that obtains a first initialization value and first, second, and third battery cell comparator overvoltage flag values from a memory device. The first, second, and third battery cell comparator overvoltage flag values are associated with the first, second, and third battery cells, respectively. The first microcontroller further obtains a second initialization value, a first battery module fault line voltage flag value, and a second battery module fault line voltage flag value from the memory device. The first and second battery module fault line values are associated with the battery module. The first microcontroller initializes each of first, second, and third battery cell comparator overvoltage flags to the first initialization value. The first microcontroller receives first, second, and third comparator bits from a second microcontroller. The first comparator bit has a first fault value if a first output voltage of the first battery cell is greater than a first threshold voltage. The second comparator bit has the first fault value if a second output voltage of the second battery cell is greater than the first threshold voltage. The third comparator bit has the first fault value if a third output voltage of the third battery cell is greater than the first threshold voltage. The first microcontroller sets the first battery cell comparator overvoltage flag equal to the first battery cell comparator overvoltage flag value if the first comparator bit is equal to the first fault value. The first microcontroller sets the second battery cell comparator overvoltage flag equal to the second battery cell comparator overvoltage flag value if the second comparator bit is equal to the first fault value. The first microcontroller sets the third battery cell comparator overvoltage flag equal to the third battery cell comparator overvoltage flag value if the third comparator bit is equal to the first fault value. The first microcontroller transitions the contactor to the open operational state if the first battery cell comparator overvoltage flag is equal to the first battery cell comparator overvoltage flag value or the second battery cell comparator overvoltage flag is equal to the second battery cell comparator overvoltage flag value or the third battery cell comparator overvoltage flag is equal to the third battery cell comparator overvoltage flag value. The first microcontroller initializes a battery module fault line voltage flag to the second initialization value. The first microcontroller measures a battery module fault line voltage on a fault line coupled to and between the first and second microcontrollers. The first microcontroller generates a battery module fault line voltage value based on the battery module fault line voltage. The first microcontroller sets the battery module fault line voltage flag equal to the first battery module fault line voltage flag value if the battery module fault line voltage value is equal to a fault voltage value indicating an overvoltage condition in at least one of the first, second, and third battery cells in the battery module. The first microcontroller transitions the contactor to the open operational state if the battery module fault line voltage flag is equal to the first battery module fault line voltage flag value.

DETAILED DESCRIPTION

Figure 1:
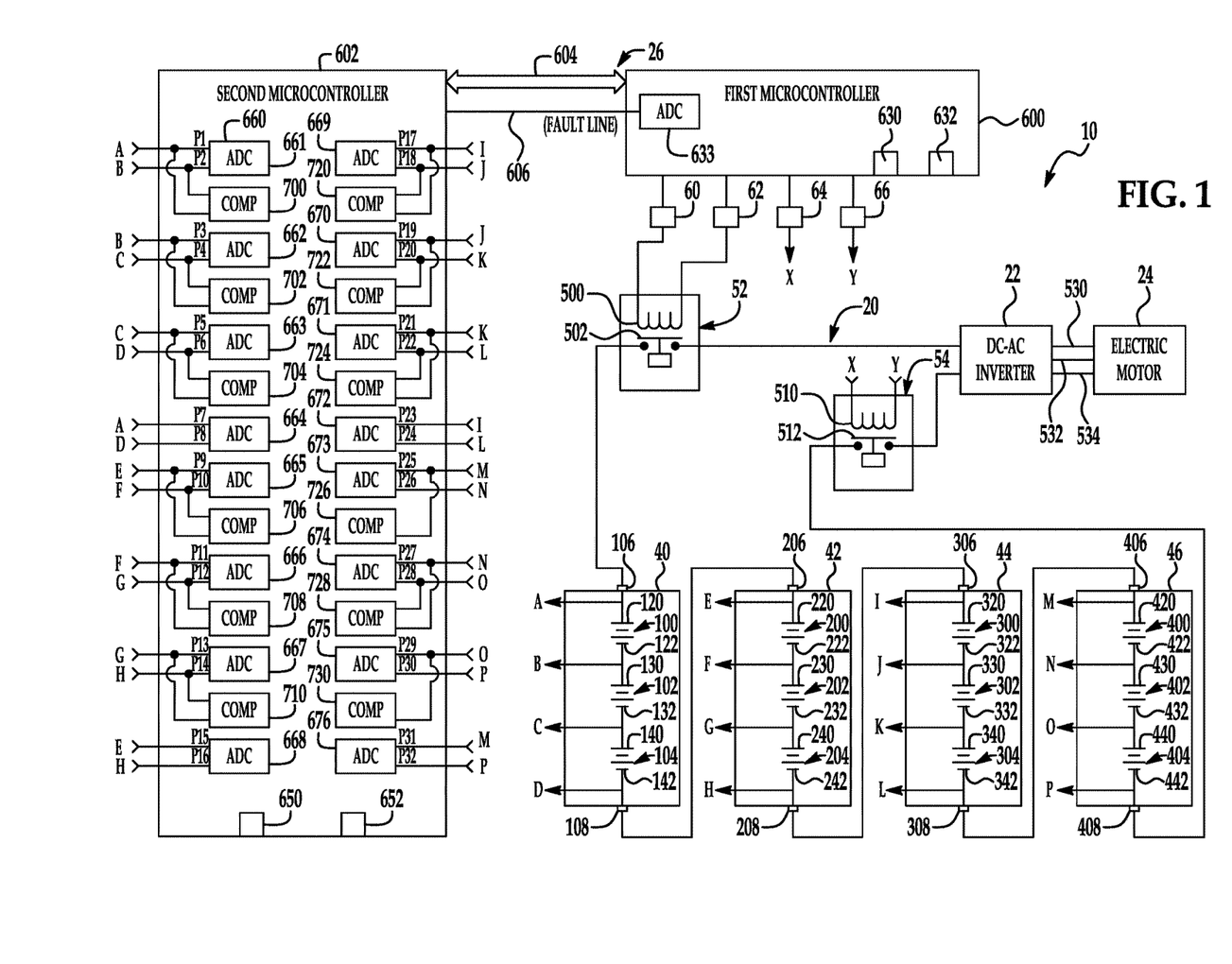
FIG. 1 is a schematic of a vehicle having a battery system, an electric motor, and a diagnostic system in accordance with an exemplary embodiment.

Referring to FIG. 1, a vehicle 10 includes a battery system 20, a DC-AC inverter 22, an electric motor 24, and a diagnostic system 26 in accordance with an exemplary embodiment.

An advantage of the diagnostic system 26 is that the system utilizes two independent types of flags (i.e., battery cell comparator overvoltage flags and a battery module fault line voltage flag) to have diagnostic diversity to determine when a contactor electrically coupled to a battery module is to be transitioned to an open operational state.

The battery system 20 provides a DC voltage to the DC-AC inverter 22. The battery system 20 includes battery modules 40, 42, 44, 46, contactors 52, 54, and voltage drivers, 60, 62, 64, 66.

The battery module 40 has first, second, and third battery cells 100, 102, 104 electrically coupled in series with one another between a positive battery module terminal 106 and a negative battery module terminal 108. In an exemplary embodiment, the first, second, and third battery cells 100, 102, 104 are pouch-type lithium-ion battery cells. Of course, in an alternative embodiment, each of the first, second, and third battery cells 100, 102, 104 could comprise another type of battery cell such as nickel-cadmium battery cell, a nickel-metal-hydride battery cell, or a lead acid battery cell for example. The first battery cell 100 has a positive terminal 120 and a negative terminal 122. Also, the second battery cell 102 has a positive terminal 130 and a negative terminal 132. Further, the third battery cell 104 has a positive terminal 140 and a negative terminal 142. The positive terminal 120 of the first battery cell 100 is coupled to the positive battery module terminal 106. The negative terminal 122 of the first battery cell 100 is coupled to the positive terminal 130 of the second battery cell 102. The negative terminal 132 of the second battery cell 102 is coupled to the positive terminal 140 of the third battery cell 104. The negative terminal 142 of the third battery cell 104 is coupled to the negative battery module terminal 108. The negative battery module terminal 108 is electrically coupled to the positive battery module terminal 206 of the battery module 42. In an alternative embodiment, the battery module 40 could have a plurality of additional battery cells electrically coupled to one another in series with the first, second, and third battery cells 100, 102, 104, or comprise only a single battery cell.

The battery module 42 has first, second, and third battery cells 200, 202, 204 electrically coupled in series with one another between a positive battery module terminal 206 and a negative battery module terminal 208. In an exemplary embodiment, the first, second, and third battery cells 200, 202, 204 are pouch-type lithium-ion battery cells. Of course, in an alternative embodiment, each of the first, second, and third battery cells 200, 202, 204 could comprise another type of battery cell such as nickel-cadmium battery cell, a nickel-metal-hydride battery cell, or a lead acid battery cell for example. The first battery cell 200 has a positive terminal 220 and a negative terminal 222. Further, the second battery cell 202 has a positive terminal 230 and a negative terminal 232. Further, the third battery cell 204 has a positive terminal 240 and a negative terminal 242. The positive terminal 220 of the first battery cell 200 is coupled to the positive battery module terminal 206. The negative terminal 222 of the first battery cell 200 is coupled to the positive terminal 230 of the second battery cell 202. The negative terminal 232 of the second battery cell 202 is coupled to the positive terminal 240 of the third battery cell 204. The negative terminal 242 of the third battery cell 204 is coupled to the negative battery module terminal 208. Further, the negative battery module terminal 208 is electrically coupled to the positive battery module terminal 306 of the battery module 44. In an alternative embodiment, the battery module 42 could have a plurality of additional battery cells electrically coupled to one another in series with the first, second, and third battery cells 200, 202, 204, or comprise only a single battery cell.

The battery module 44 has first, second, and third battery cells 300, 302, 304 that are electrically coupled in series with one another between a positive battery module terminal 306 and a negative battery module terminal 308. In an exemplary embodiment, the first, second, and third battery cells 300, 302, 304 are pouch-type lithium-ion battery cells. Of course, in an alternative embodiment, each of the first, second, and third battery cells 300, 302, 304 could comprise another type of battery cell such as nickel-cadmium battery cell, a nickel-metal-hydride battery cell, or a lead acid battery cell for example. The first battery cell 300 has a positive terminal 320 and a negative terminal 322. Further, the second battery cell 302 has a positive terminal 330 and a negative terminal 332. Further, the third battery cell 304 has a positive terminal 340 and a negative terminal 342. The positive terminal 320 of the first battery cell 300 is coupled to the positive battery module terminal 306. The negative terminal 322 of the first battery cell 300 is coupled to the positive terminal 330 of the second battery cell 302. The negative terminal 332 of the second battery cell 302 is coupled to the positive terminal 340 of the third battery cell 304. The negative terminal 342 of the third battery cell 304 is coupled to the negative battery module terminal 308. Further, the negative battery module terminal 308 is electrically coupled to the positive battery module terminal 406 of the battery module 46. In an alternative embodiment, the battery module 44 could have a plurality of additional battery cells electrically coupled to one another in series with the first, second, and third battery cells 300, 302, 304, or comprise only a single battery cell.

The battery module 46 has first, second, and third battery cells 400, 402, 404 electrically coupled in series with one another between a positive battery module terminal 406 and a negative battery module terminal 408. In an exemplary embodiment, the first, second, and third battery cells 400, 402, 404 are pouch-type lithium-ion battery cells. Of course, in an alternative embodiment, each of the first, second, and third battery cells 400, 402, 404 could comprise another type of battery cell such as nickel-cadmium battery cell, a nickel-metal-hydride battery cell, or a lead acid battery cell for example. The first battery cell 400 has a positive terminal 420 and a negative terminal 422. Further, the second battery cell 402 has a positive terminal 430 and a negative terminal 432. Further, the third battery cell 404 has a positive terminal 440 and a negative terminal 442. The positive terminal 420 of the first battery cell 400 is coupled to the positive battery module terminal 406. The negative terminal 422 of the first battery cell 400 is coupled to the positive terminal 430 of the second battery cell 402. The negative terminal 432 of the second battery cell 402 is coupled to the positive terminal 440 of the third battery cell 404. The negative terminal 442 of the third battery cell 404 is coupled to the negative battery module terminal 408. In an alternative embodiment, the battery module 46 could have a plurality of additional battery cells electrically coupled to one another in series with the first, second, and third battery cells 400, 402, 404, or comprise only a single battery cell.

The contactor 52 is electrically coupled in series between the positive battery module terminal 106 and the DC-AC inverter 22. The contactor 52 includes a contactor coil 500 and a contact 502. When the first microcontroller 600 generates first and second control signals that are received by the voltage drivers 60, 62, respectively, the voltage drivers 60, 62, energize the contactor coil 500, which moves the contact 502 to a closed operational state. Alternately, when the first microcontroller 600 stops generating the first and second control signals, the voltage drivers 60, 62 de-energize the contactor coil 500, which moves the contact 502 to an open operational state.

The contactor 54 is electrically coupled in series between the negative battery module terminal 408 and the DC-AC inverter 22. The contactor 54 includes a contactor coil 510 and a contact 512. When the first microcontroller 600 generates third and fourth control signals that are received by the voltage drivers 64, 66, respectively, the voltage drivers 64, 66, energize the contactor coil 510, which moves the contact 512 to a closed operational state. Alternately, when the first microcontroller 600 stops generating the third and fourth control signals, the voltage drivers 64, 66 de-energize the contactor coil 510, which moves the contact 512 to an open operational state.

The DC-AC inverter 22 is electrically coupled to and between the contactors 52, 54, and provides AC power to the electric motor 24 via the electrical lines 530, 532, 534, only when the contactors 52, 54 each have a closed operational state.

The diagnostic system 26 includes a first microcontroller 600, a second microcontroller 602, a communication bus 604, and a fault line 606.

The first microcontroller 600 includes a microprocessor 630, a memory device 632, and an analog-to-digital converter (ADC) 633. The microprocessor 630 operably communicates with the memory device 632 and the analog-to-digital converter 633. Further, the microprocessor 630 operably communicates with the microprocessor 650 of the second microcontroller 602 via the communication bus 604, and the fault line 606 which is electrically coupled to the analog-to-digital converter 633. The microprocessor 630 utilizes software instructions stored in the memory device 632 to implement at least in part the diagnostic steps described hereinafter, based on data and values received from the second microcontroller 602, as will be described in greater detail below.

The second microcontroller 602 includes a microprocessor 650, a memory device 652, an analog-to-digital converter (ADC) 660, and voltage comparators 700, 702, 704, 706, 708, 710, 720, 722, 724, 726, 728, 730. The microprocessor 650 operably communicates with the memory device 652, the analog-to-digital converter 660, and the voltage comparators 700, 702, 704, 660, 708, 710, 720, 722, 724, 726, 728, 730. The microprocessor 650 utilizes software instructions stored in the memory device 652 to implement at least in part the operational steps for the second microcontroller 602.

The analog-to-digital converter 660 includes ADC differential channels 661, 662, 663, 664, 665, 666, 667, 668, 669, 670, 671, 672, 673, 674, 675, 676.

The ADC differential channel 661 has input pins P1, P2 which are electrically coupled to the positive terminal 120 and the negative terminal 122, respectively, of the first battery cell 100 to measure an output voltage of the first battery cell 100 between the terminals 120, 122, and the analog-to-digital converter 660 generates an output voltage value based on the measured output voltage.

The ADC differential channel 662 has input pins P3, P4 which are electrically coupled to the positive terminal 130 and the negative terminal 132, respectively, of the second battery cell 102 to measure an output voltage of the second battery cell 102 between the terminals 130, 132, and the analog-to-digital converter 660 generates an output voltage value based on the measured output voltage.

The ADC differential channel 663 has input pins P5, P6 which are electrically coupled to the positive terminal 140 and the negative terminal 142, respectively, of the third battery cell 104 to measure an output voltage of the third battery cell 104 between the terminals 140, 142, and the analog-to-digital converter 660 generates an output voltage value based on the measured output voltage.

The ADC differential channel 664 has input pins P7, P8 which are electrically coupled to the positive battery module terminal 106 and a negative battery module terminal 108 to measure a battery module output voltage of the battery module 40, and the analog-to-digital converter 660 generates a battery module output voltage value based on the measured battery module output voltage.

The ADC differential channel 665 has input pins P9, P10 which are electrically coupled to the positive terminal 220 and the negative terminal 222, respectively, of the first battery cell 200 to measure an output voltage of the first battery cell 200 between the terminals 220, 222, and the analog-to-digital converter 660 generates an output voltage value based on the measured output voltage.

The ADC differential channel 666 has input pins P11, P12 which are electrically coupled to the positive terminal 230 and the negative terminal 232, respectively, of the second battery cell 202 to measure an output voltage of the second battery cell 202 between the terminals 230, 232, and the analog-to-digital converter 660 generates an output voltage value based on the measured output voltage.

The ADC differential channel 667 has input pins P13, P14 which are electrically coupled to the positive terminal 240 and the negative terminal 242, respectively, of the third battery cell 204 to measure an output voltage of the third battery cell 204 between the terminals 240, 242, and the analog-to-digital converter 660 generates an output voltage value based on the measured output voltage.

The ADC differential channel 668 has input pins P15, P16 which are electrically coupled to the positive battery module terminal 206 and a negative battery module terminal 208 to measure a battery module output voltage of the battery module 42, and the analog-to-digital converter 660 generates a battery module output voltage value based on the measured battery module output voltage.

The ADC differential channel 669 has input pins P17, P18 which are electrically coupled to the positive terminal 320 and the negative terminal 322, respectively, of the first battery cell 300 to measure an output voltage of the first battery cell 300 between the terminals 320, 322, and the analog-to-digital converter 660 generates an output voltage value based on the measured output voltage.

The ADC differential channel 670 has input pins P19, P20 which are electrically coupled to the positive terminal 330 and the negative terminal 332, respectively, of the second battery cell 302 to measure an output voltage of the second battery cell 302 between the terminals 330, 332, and the analog-to-digital converter 660 generates an output voltage value based on the measured output voltage.

The ADC differential channel 671 has input pins P21, P22 which are electrically coupled to the positive terminal 340 and the negative terminal 342, respectively, of the third battery cell 304 to measure an output voltage of the third battery cell 304 between the terminals 340, 342, and the analog-to-digital converter 660 generates an output voltage value based on the measured output voltage.

The ADC differential channel 672 has input pins P23, P24 which are electrically coupled to the positive battery module terminal 306 and a negative battery module terminal 308 to measure a battery module output voltage of the battery module 44, and the analog-to-digital converter 660 generates a battery module output voltage value based on the measured battery module output voltage.

The ADC differential channel 673 has input pins P25, P26 which are electrically coupled to the positive terminal 420 and the negative terminal 422, respectively, of the first battery cell 400 to measure an output voltage of the first battery cell 400 between the terminals 420, 422, and the analog-to-digital converter 660 generates an output voltage value based on the measured output voltage.

The ADC differential channel 674 has input pins P27, P28 which are electrically coupled to the positive terminal 430 and the negative terminal 432, respectively, of the second battery cell 402 to measure an output voltage of the second battery cell 402 between the terminals 430, 432, and the analog-to-digital converter 660 generates an output voltage value based on the measured output voltage.

The ADC differential channel 675 has input pins P29, P30 which are electrically coupled to the positive terminal 440 and the negative terminal 442, respectively, of the third battery cell 404 to measure an output voltage of the third battery cell 404 between the terminals 440, 442, and the analog-to-digital converter 660 generates an output voltage value based on the measured output voltage.

The ADC differential channel 676 has input pins P31, P32 which are electrically coupled to the positive battery module terminal 406 and a negative battery module terminal 408 to measure a battery module output voltage of the battery module 46, and the analog-to-digital converter 660 generates a battery module output voltage value based on the measured battery module output voltage.

The voltage comparator 700 is electrically coupled to the input pins P1, P2 of the ADC differential channel 661, and compares the output voltage (between input pins P1, P2) of the first battery cell 100 to a voltage comparator threshold voltage. If the output voltage of the first battery cell 100 is greater than the voltage comparator threshold voltage indicating a cell overvoltage condition, the voltage comparator 700 sets an associated comparator output bit to a binary "1" value (i.e., a fault value). Otherwise, the voltage comparator 700 sets the associated comparator output bit to a binary "0" value.

The voltage comparator 702 is electrically coupled to the input pins P3, P4 of the ADC differential channel 662, and compares the output voltage (between input pins P3, P4) of the second battery cell 102 to the voltage comparator threshold voltage. If the output voltage of the second battery cell 102 is greater than the voltage comparator threshold voltage indicating a cell overvoltage condition, the voltage comparator 702 sets an associated comparator output bit to a binary "1" value. Otherwise, the voltage comparator 702 sets the associated comparator output bit to a binary "0" value.

The voltage comparator 704 is electrically coupled to the input pins P5, P6 of the ADC differential channel 663, and compares the output voltage (between input pins P5, P6) of the third battery cell 104 to the voltage comparator threshold voltage. If the output voltage of the third battery cell 104 is greater than the voltage comparator threshold voltage indicating a cell overvoltage condition, the voltage comparator 704 sets an associated comparator output bit to a binary "1" value. Otherwise, the voltage comparator 704 sets the associated comparator output bit to a binary "0" value.

The voltage comparator 706 is electrically coupled to the input pins P9, P10 of the ADC differential channel 665, and compares the output voltage (between input pins P9, P10) of the first battery cell 200 to the voltage comparator threshold voltage. If the output voltage of the first battery cell 200 is greater than the voltage comparator threshold voltage indicating a cell overvoltage condition, the voltage comparator 706 sets an associated comparator output bit to a binary "1" value. Otherwise, the voltage comparator 706 sets the associated comparator output bit to a binary "0" value.

The voltage comparator 708 is electrically coupled to the input pins P11, P12 of the ADC differential channel 666, and compares the output voltage (between input pins P11, P12) of the second battery cell 202 to the voltage comparator threshold voltage. If the output voltage of the second battery cell 202 is greater than the voltage comparator threshold voltage indicating a cell overvoltage condition, the voltage comparator 708 sets an associated comparator output bit to a binary "1" value. Otherwise, the voltage comparator 708 sets the associated comparator output bit to a binary "0" value.

The voltage comparator 710 is electrically coupled to the input pins P13, P14 of the ADC differential channel 667, and compares the output voltage (between input pins P13, P14) of the third battery cell 204 to the voltage comparator threshold voltage. If the output voltage of the third battery cell 204 is greater than the voltage comparator threshold voltage indicating a cell overvoltage condition, the voltage comparator 710 sets an associated comparator output bit to a binary "1" value. Otherwise, the voltage comparator 710 sets the associated comparator output bit to a binary "0" value.

The voltage comparator 720 is electrically coupled to input pins P17, P18 of the ADC differential channel 669, and compares the output voltage (between input pins P17, P18) of the first battery cell 300 to a voltage comparator threshold voltage. If the output voltage of the first battery cell 300 is greater than the voltage comparator threshold voltage indicating a cell overvoltage condition, the voltage comparator 720 sets an associated comparator output bit to a binary "1" value (i.e., a fault value). Otherwise, the voltage comparator 720 sets the associated comparator output bit to a binary "0" value.

The voltage comparator 722 is electrically coupled to input pins P19, P20 of the ADC differential channel 670, and compares the output voltage (between input pins P19, P20) of the second battery cell 302 to the voltage comparator threshold voltage. If the output voltage of the second battery cell 302 is greater than the voltage comparator threshold voltage indicating a cell overvoltage condition, the voltage comparator 722 sets an associated comparator output bit to a binary "1" value. Otherwise, the voltage comparator 722 sets the associated comparator output bit to a binary "0" value.

The voltage comparator 724 is electrically coupled to input pins P21, P22 of the ADC differential channel 671, and compares the output voltage (between input pins P21, P22) of the third battery cell 304 to the voltage comparator threshold voltage. If the output voltage of the third battery cell 304 is greater than the voltage comparator threshold voltage indicating a cell overvoltage condition, the voltage comparator 724 sets an associated comparator output bit to a binary "1" value. Otherwise, the voltage comparator 724 sets the associated comparator output bit to a binary "0" value.

The voltage comparator 726 is electrically coupled to input pins P25, P26 of the ADC differential channel 673, and compares the output voltage (between input pins P25, P26) of the first battery cell 400 to the voltage comparator threshold voltage. If the output voltage of the first battery cell 400 is greater than the voltage comparator threshold voltage indicating a cell overvoltage condition, the voltage comparator 726 sets an associated comparator output bit to a binary "1" value. Otherwise, the voltage comparator 726 sets the associated comparator output bit to a binary "0" value.

The voltage comparator 728 is electrically coupled to input pins P27, P28 of the ADC differential channel 674, and compares the output voltage (between input pins P27, P28) of the second battery cell 402 to the voltage comparator threshold voltage. If the output voltage of the second battery cell 402 is greater than the voltage comparator threshold voltage indicating a cell overvoltage condition, the voltage comparator 728 sets an associated comparator output bit to a binary "1" value. Otherwise, the voltage comparator 728 sets the associated comparator output bit to a binary "0" value.

The voltage comparator 730 is electrically coupled to input pins P29, P30 of the ADC differential channel 675, and compares the output voltage (between input pins P29, P30) of the third battery cell 404 to the voltage comparator threshold voltage. If the output voltage of the third battery cell 404 is greater than the voltage comparator threshold voltage indicating a cell overvoltage condition, the voltage comparator 730 sets an associated comparator output bit to a binary "1" value. Otherwise, the voltage comparator 730 sets the associated comparator output bit to a binary "0" value.

The second microcontroller 602 operably communicates with the first microcontroller 600 utilizing a communication bus 604. Further, the second microcontroller 602 sets a fault line 606 to a fault voltage (e.g., a high logic voltage having a magnitude corresponding to a fault voltage value) if at least one of the first, second, and third output voltages of the first, second, and third battery cells 100, 102, 104, respectively, of the battery module 40 are greater than the voltage comparator threshold voltage, or at least one of the first, second, and third output voltages of the first, second, and third battery cells 200, 202, 204, respectively, of the battery module 42 are greater than the voltage comparator threshold voltage, or at least one of the first, second, and third output voltages of the first, second, and third battery cells 300, 302, 304, respectively, of the battery module 44 are greater than the voltage comparator threshold voltage, or at least one of the first, second, and third output voltages of the first, second, and third battery cells 400, 402, 404, respectively, of the battery module 46 are greater than the voltage comparator threshold voltage.

Figure 2:
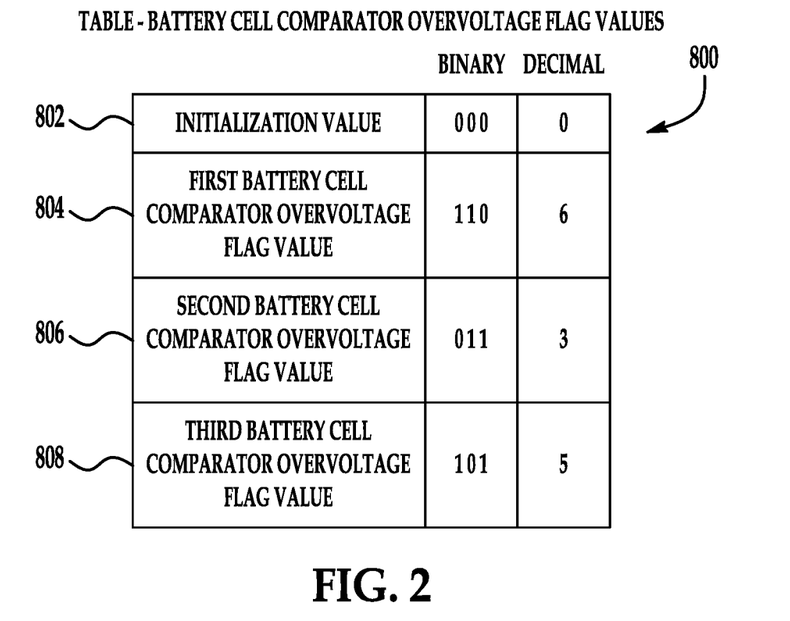
FIG. 2 is a table of battery module overvoltage flag values utilized by the diagnostic system of FIG. 1.

Referring to FIG. 2, an exemplary table 800 stored in the memory device 632 in the first microcontroller 600 is illustrated. The table 800 has records 802, 804, 806, 808 therein. The table 800 includes battery cell comparator overvoltage flag values which are associated with the first, second, and third battery cells 100, 102, 104, respectively, in the battery module 40 are illustrated. It is noted that each of the other modules would have a distinct table with other battery cell comparator overvoltage flag values for battery cells in the respective tables.

The record 802 is associated with the first, second, and third battery cells 100, 102, 104. The record 802 includes an initialization value which is a binary value "000" corresponding to the decimal value of "0." The first, second, and third battery cell comparator overvoltage flags associated with the first, second, and third battery cells 100, 102, 104, respectively, are initially set equal to the initialization value "000"—which indicates that no overvoltage condition is initially detected in the first, second, and third battery cells 100, 102, 104 by voltage comparators 700, 702, 704, respectively.

The record 804 is associated with the first battery cell 100 in the battery module 40. The record 804 includes a first battery cell comparator overvoltage flag value which is binary value "110" corresponding to the decimal value of "6." The first battery cell comparator overvoltage flag associated with the first battery cell 100 is set equal to the first battery cell comparator overvoltage flag value "110" if an overvoltage condition (corresponding to the first battery cell 100 having an output voltage level greater than the voltage comparator threshold voltage is detected in the first battery cell 100 by the voltage comparator 700.

The record 806 is associated with the second battery cell 102 in the battery module 40. The record 806 includes a second battery cell comparator overvoltage flag value which is binary value "011" corresponding to the decimal value of "3." The second battery cell comparator overvoltage flag associated with the second battery cell 102 is set equal to the second battery cell comparator overvoltage flag value "011" if an overvoltage condition (corresponding to the second battery cell 102 having an output voltage level greater than the voltage comparator threshold voltage is detected in the second battery cell 102 by the voltage comparator 702.

The record 808 is associated with the third battery cell 104 in the battery module 40. The record 808 includes a third battery cell comparator overvoltage flag value which is binary value "101" corresponding to the decimal value of "5." The third battery cell comparator overvoltage flag associated with the third battery cell 104 is set equal to the third battery cell comparator overvoltage flag value "101" if an overvoltage condition (corresponding to the third battery cell 104 having an output voltage level greater than the voltage comparator threshold voltage is detected in the third battery cell 104 by the voltage comparator 704.

It is noted that in table 800, the initialization value and the first, second, third and fourth battery cell comparator overvoltage flag values each have a Hamming distance of at least two from each other. Further, in table 800, the initialization value and the first, second, third and fourth battery cell comparator overvoltage flag values each have a Hamming distance of at least two from the initialization value and the first, second, third and fourth battery cell analog overvoltage flag values in the table 780.

Figure 3:
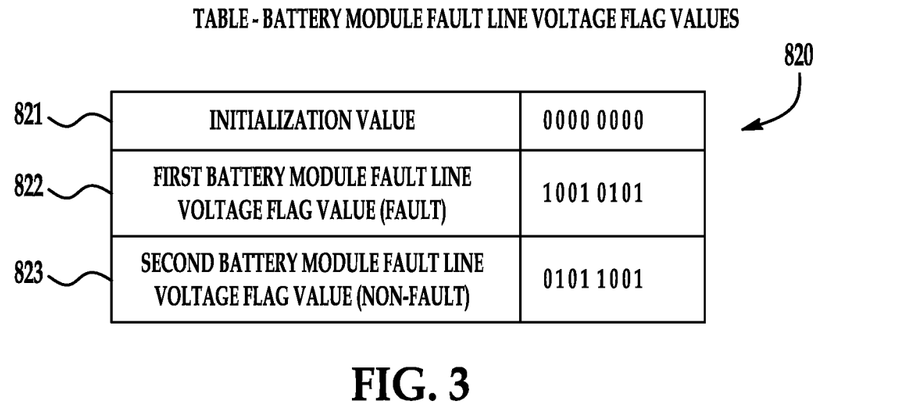
FIG. 3 is a table of battery module fault line voltage flag values utilized by the diagnostic system of FIG. 1.

Referring to FIG. 3, an exemplary table 820 stored in the memory device 632 in the first microcontroller 600 is illustrated. The table 820 has records 821, 822, 823 therein. The table 820 includes battery module fault line voltage flag values which are associated with the battery module 40. It is noted that each of the other battery modules would have a distinct table with other battery module fault line voltage flag values.

The record 821 includes an initialization value which is a binary value "00000000." The battery module fault line voltage flag is initially set equal to the initialization value "00000000" which indicates that no overvoltage condition is initially detected in the first, second, and third battery cells 100, 102, 104 in the battery module 40.

The record 822 includes a first battery module fault line voltage flag value which is binary value "10010101." The battery module fault line voltage flag is set equal to the first battery module fault line voltage flag value "10010101" if an overvoltage condition is detected in at least one of the battery cells 100, 102, 104 in the battery module 40.

The record 823 includes a second battery module fault line voltage flag value which is binary value "01011001." The battery module fault line voltage flag is set equal to the second battery module overvoltage flag value "01011001" if an overvoltage condition is not detected in the battery cells 100, 102, 104 in the battery module 40.

It is noted that in table 820, the initialization value and the first and second battery module fault line voltage flag values each have a Hamming distance of at least two from each other.

Figure 4:
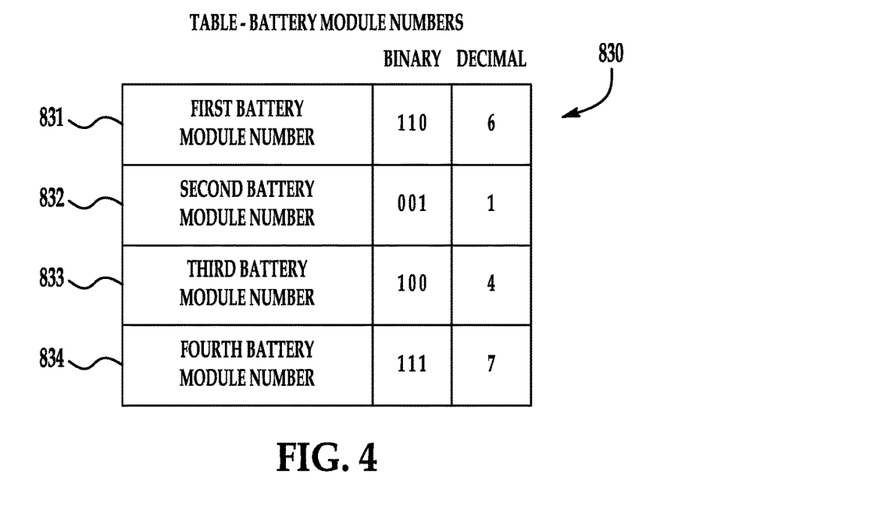
FIG. 4 is a table of battery module numbers associated with first, second, third, and fourth battery modules, that are utilized by the diagnostic system of FIG. 1.

Referring to FIGS. 1 and 4, an exemplary table 830 that is stored in the memory device 632 in the first microcontroller 600 is illustrated. The table 830 has records 831, 832, 833, 834 therein. The table 830 includes battery module numbers which are associated with the first, second, third, and fourth battery modules 40, 42, 44, 46, respectively.

The record 831 has a first battery module number associated with the battery module 40. In particular, the first battery module number is a binary value "110" corresponding to a decimal value "6."

The record 832 has a second battery module number associated with the battery module 42. In particular, the second battery module number is a binary value "001" corresponding to a decimal value "1."

The record 833 has a third battery module number associated with the battery module 44. In particular, the third battery module number is a binary value "100" corresponding to a decimal value "4."

The record 834 has a fourth battery module number associated with the battery module 46. In particular, the fourth battery module number is a binary value "111" corresponding to a decimal value "7."

Figure 5:
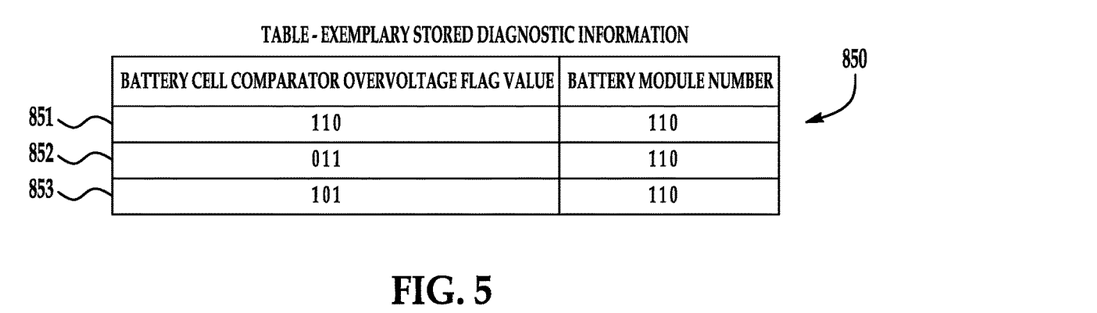
FIG. 5 is table of exemplary stored diagnostic information generated by the diagnostic system of FIG. 1.

Referring to FIGS. 1 and 5, an exemplary table 850 that is stored in the memory device 632 in the first microcontroller 600 is illustrated. The table 850 has records 851, 852, 853 associated with the first, second, and third battery cells 100, 102, 104, respectively, therein. The table 850 is used to stored exemplary battery cell analog overvoltage flags therein.

The record 851 is associated with the first battery cell 100 in the battery module 40. The record 851 includes a first battery cell comparator overvoltage flag which is binary value "110" (defined in table 800) indicating an overvoltage condition in the first battery cell 100, and a battery module number "110" (defined in table 830) associated with the battery module 40.

The record 852 is associated with the second battery cell 102 in the battery module 40. The record 852 includes a second battery cell comparator overvoltage flag which is binary value "011" indicating an overvoltage condition in the second battery cell 102, and a battery module number "110" associated with the battery module 40.

The record 853 is associated with the third battery cell 104 in the battery module 40. The record 853 includes a third battery cell comparator overvoltage flag which is binary value "101" indicating an overvoltage condition in the third battery cell 104, and a battery module number "110" associated with the battery module 40.

Referring to FIGS. 1-3, and 6-8, the diagnostic system 26 implements a diagnostic method for the battery module 40 in the battery system 20 which will be described in further detail below. In particular, the diagnostic method is utilized to set first, second, and third battery cell comparator overvoltage flags associated with the first, second, and third battery cells 100, 102, 104, respectively, and to further set a battery module fault line voltage flag associated with the battery module 40 in order to determine whether at least one of the contactors 52, 54 should be transitioned from a closed operational state to an open operational state. For purposes of simplicity, the diagnostic method will only be discussed with respect to the first, second, third battery cells 100, 102, 104 and the battery module 40. However it should be understood that the diagnostic method could further be implemented to encompass testing the battery cells in the other battery modules 42, 44, 46, in order to determine whether at least one of the contactors 52, 54 should be transitioned from a closed operational state to an open operational state. In an exemplary embodiment, the diagnostic system 26 transitions at least one of the contactors 52, 54 from a closed operational state to an open operational state if any of the battery cells 100, 102, 104 have an overvoltage condition or if the fault line 606 indicates an overvoltage condition in at least one of the battery cells 100, 102, 104. Further, when the first controller 600 transitions the contactor 52 from a closed operational state to an open operational state in the diagnostic method, the first controller 600 could also simultaneously transition the contactor 54 from the closed operational state to the open operational state. However, for purposes of simplicity, the diagnostic method will only be discussed with respect to the contactor 52. Further, it is assumed that prior to implementing the diagnostic method that the first microcontroller 600 is generating control signals to induce the contactor 52 and the contactor 54 to each have closed operational states.

Figure 6:
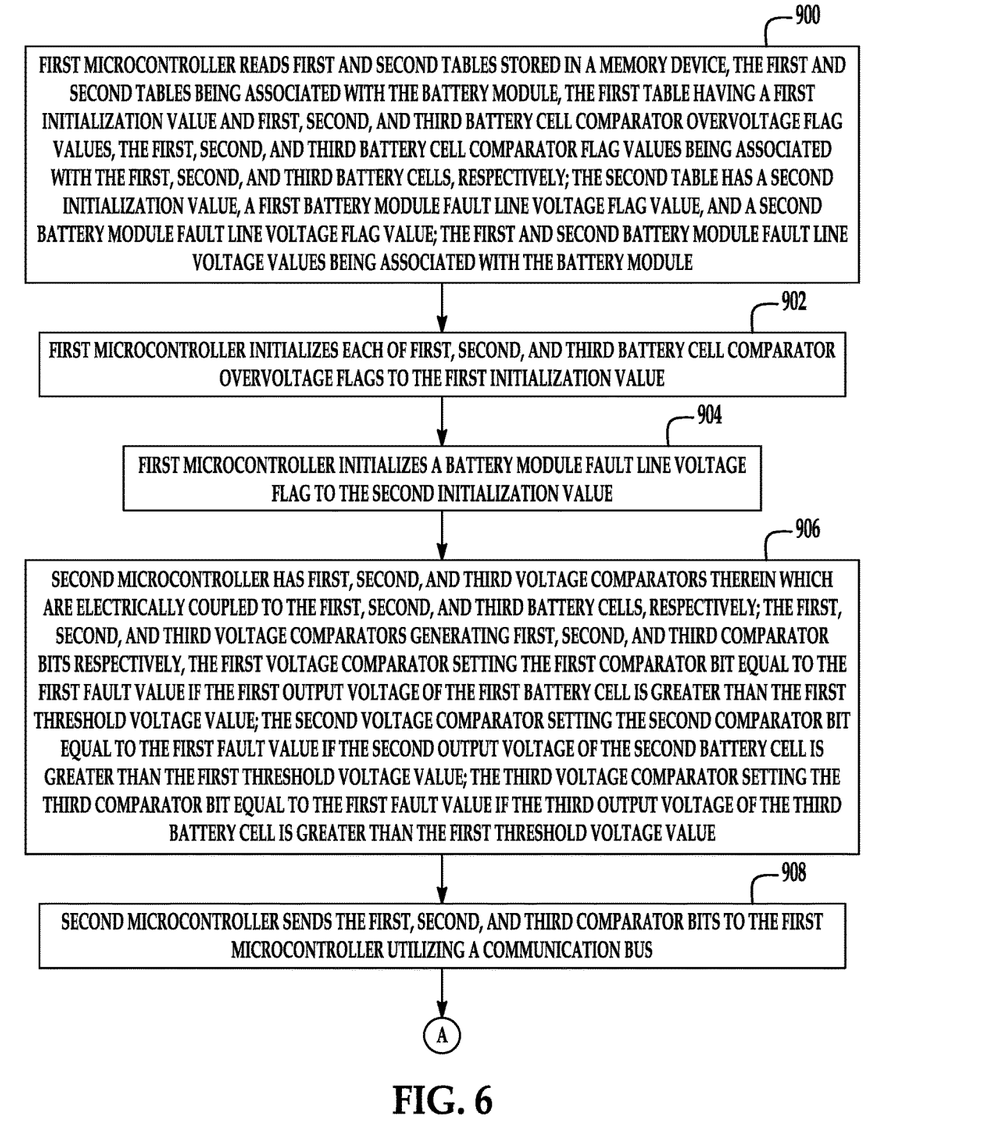
FIGS. 6-8 are flowcharts of a diagnostic method utilized by the diagnostic system of FIG. 1.

At step 900, the first microcontroller 600 reads tables 800, 820 (shown in FIGS. 2 and 3) stored in the memory device 632. The tables 800, 820 are associated with the battery module 40. The table 800 has a first initialization value and first, second, and third battery cell comparator overvoltage flag values therein. The first, second, and third battery cell comparator overvoltage flag values are associated with the first, second, and third battery cells 100, 102, 104, respectively. The table 820 has a second initialization value, a first battery module fault line voltage flag value, and a second battery module fault line voltage flag value therein. The first and second battery module fault line values are associated with the battery module 40. After step 900, the method advances to step 902.

At step 902, the first microcontroller 600 initializes each of first, second, and third battery cell comparator overvoltage flags to the first initialization value. After step 902, the method advances to step 904.

At step 904, the first microcontroller 600 initializes a battery module fault line voltage flag to the second initialization value. After step 904, the method advances to step 906.

At step 906, the second microcontroller 602 has voltage comparators 700, 702, 704 therein which are electrically coupled to the first, second, and third battery cells 100, 102, 104, respectively. The voltage comparators 700, 702, 704 generate first, second, and third comparator bits. The voltage comparator 700 sets the first comparator bit equal to the first fault value if the first output voltage of the first battery cell 100 is greater than the first threshold voltage value. The voltage comparator 702 sets the second comparator bit equal to the first fault value if the second output voltage of the second battery cell 102 is greater than the first threshold voltage value. The third voltage comparator 704 sets the third comparator bit equal to the first fault value if the third output voltage of the third battery cell 104 is greater than the first threshold voltage value. After step 906, the method advances to step 908.

At step 908, the second microcontroller 602 sends the first, second, and third comparator bits to the first microcontroller 600 utilizing the communication bus 604. After step 908, the method advances to step 920.

Figure 7:
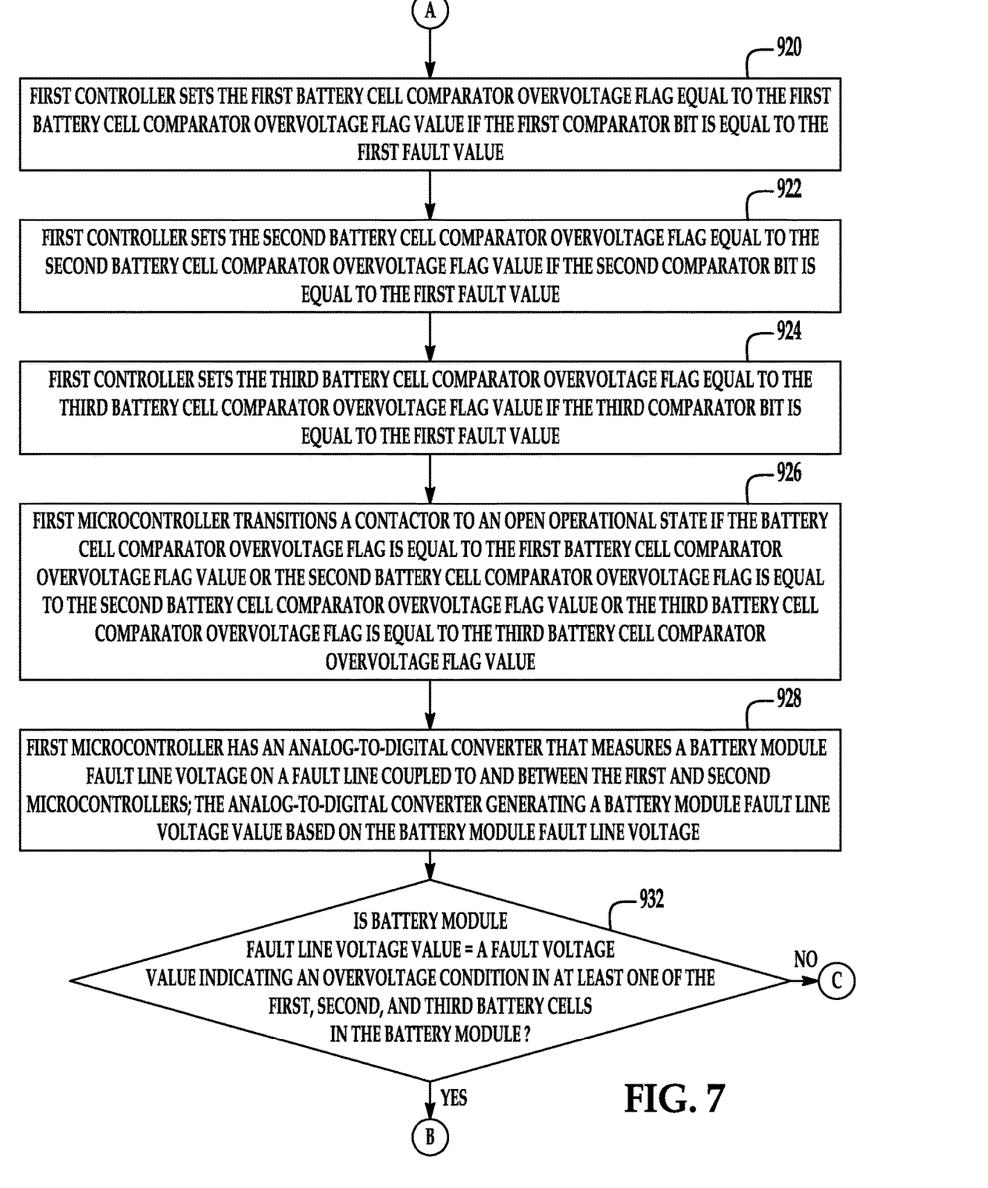

At step 920, the first microcontroller 600 sets the first battery cell comparator overvoltage flag equal to the first battery cell comparator overvoltage flag value if the first comparator bit is equal to the first fault value. After step 920, the method advances to step 922.

At step 922, the first microcontroller 600 sets the second battery cell comparator overvoltage flag equal to the second battery cell comparator overvoltage flag value if the second comparator bit is equal to the first fault value. After step 922, the method advances to step 924.

At step 924, the first microcontroller 600 sets the third battery cell comparator overvoltage flag equal to the third battery cell comparator overvoltage flag value if the third comparator bit is equal to the first fault value. After step 924, the method advances to step 926.

At step 926, the first microcontroller 600 transitions the contactor 52 to an open operational state if the first battery cell comparator overvoltage flag is equal to the first battery cell comparator overvoltage flag value or the second battery cell comparator overvoltage flag is equal to the second battery cell comparator overvoltage flag value or the third battery cell comparator overvoltage flag is equal to the third battery cell comparator overvoltage flag value. After step 926, the method advances to step 928.

At step 928, the second microcontroller 602 has an analog-to-digital converter 633 that measures the battery module fault line voltage on a fault line 606 coupled to and between the first and second microcontrollers 600, 602. The analog-to-digital converter 633 generates a battery module fault line voltage value based on the battery module fault line voltage. After step 928, the method advances to step 932.

At step 932, the first microcontroller 600 makes a determination as to whether the battery module fault line voltage value is equal to a fault voltage value indicating an overvoltage condition in at least one of the first, second, and third battery cells 100, 102, 104 in the battery module 40. If the value of step 932 equals "yes", the method advances to step 940. Otherwise, the method advances to step 942.

At step 940, the first microcontroller 600 sets the battery module fault line voltage flag equal to the first battery module fault line voltage flag value. After step 940, the method advances to step 944.

Referring again to step 932, if the value of step 932 equals "no", the method advances to step 942. At step 942, the first microcontroller 600 sets the battery module fault line voltage flag equal to the second battery module fault line voltage flag value. After step 942, the method advances to step 944.

Figure 8:
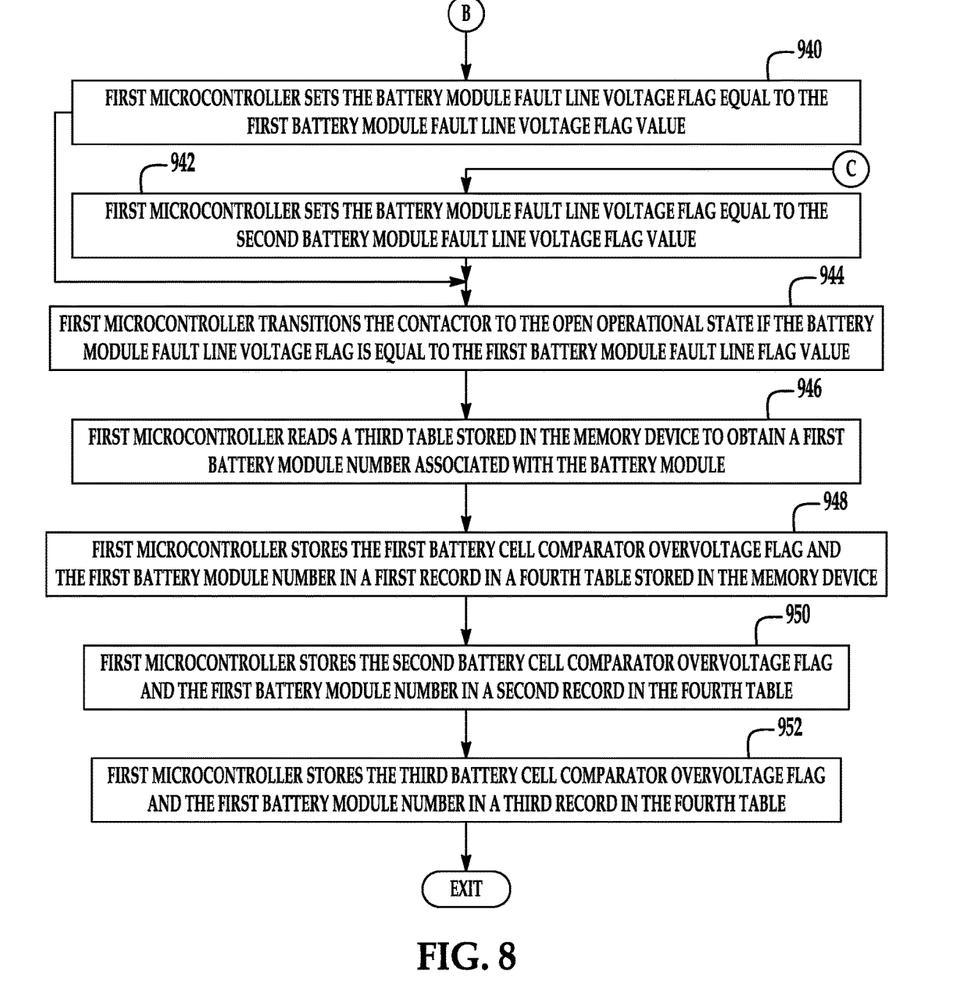

At step 944, the first microcontroller 600 transitions the contactor 52 to the open operational state if the battery module fault line voltage flag is equal to the first battery module fault line voltage flag value. After step 944, the method advances to step 946.

At step 946, the first microcontroller 600 reads the table 830 (shown in FIG. 4) stored in the memory device 632 to obtain a first battery module number associated with the battery module 40. After step 946, the method advances to step 948.

At step 948, the first microcontroller 600 stores the first battery cell comparator overvoltage flag and the first battery module number in a first record 851 in the table 850 (shown in FIG. 5) stored in the memory device 632. After step 948, the method advances to step 950.

At step 950, the first microcontroller 600 stores the second battery cell comparator overvoltage flag and the first battery module number in a second record 852 in the table 850. After step 950, the method advances to step 952.

At step 952, the first microcontroller 600 stores the third battery cell comparator overvoltage flag and the first battery module number in a third record 853 in the table 850. After step 952, the method is exited.

The above-described methods can be at least partially embodied in the form of one or more memory devices having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more microcontrollers, the microcontrollers become an apparatus programmed to practice the associated steps of the method. Further, for purposes of understanding, when a voltage value corresponds to (or is based on) a voltage, the voltage value is proportional to or equal to a magnitude or a frequency of the voltage.

The diagnostic system described herein provides a substantial advantage over other systems. In particular, an advantage of the diagnostic system is that the system utilizes two independent types of flags (i.e., battery cell comparator overvoltage flags and a battery module fault line voltage flag) to have diagnostic diversity to determine when a contactor electrically coupled to a battery module is to be transitioned to an open operational state.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A diagnostic system for a battery system having a battery module electrically coupled to a contactor, the battery module having a first battery cell, comprising:
 a first microcontroller initializing a first battery cell comparator overvoltage flag associated with the first battery cell to a first initialization value;
 the first microcontroller receiving a first comparator bit from a second microcontroller; the first comparator bit having a first fault value if a first output voltage of the first battery cell is greater than a first threshold voltage;
 the first microcontroller setting the first battery cell comparator overvoltage flag equal to a first battery cell comparator overvoltage flag value if the first comparator bit is equal to the first fault value;
 the first microcontroller transitioning the contactor to the open operational state if the first battery cell comparator overvoltage flag is equal to the first battery cell comparator overvoltage flag value;
 the first microcontroller initializing a battery module fault line voltage flag associated with the battery module to a second initialization value;
 the first microcontroller measuring a battery module fault line voltage on a fault line coupled to and between the first and second microcontrollers, the first microcontroller generating a battery module fault line voltage value based on the battery module fault line voltage;
 the first microcontroller setting the battery module fault line voltage flag equal to the first battery module fault line voltage flag value if the battery module fault line voltage value is equal to a fault voltage value indicating an overvoltage condition in the first battery cell in the battery module; and
 the first microcontroller transitioning the contactor to the open operational state if the battery module fault line voltage flag is equal to the first battery module fault line voltage flag value.

2. The diagnostic system of claim 1, wherein the first initialization value and the first battery cell comparator overvoltage flag value each have a Hamming distance of at least two from each other, and the second initialization value and the first battery module fault line voltage flag value each have a Hamming distance of at least two from each other.

3. The diagnostic system of claim 2, wherein the first initialization value and the first battery cell comparator overvoltage flag value are distinct values different from one another, and the second initialization value and the first battery module fault line voltage flag value are distinct values different from one another.

4. The diagnostic system of claim 2, wherein the first microcontroller obtains the first initialization value and the first battery cell comparator overvoltage flag value by reading a first table stored in the memory device; the first table being associated with the battery module; the first table having the first initialization value and the first battery cell comparator overvoltage flag value therein.

5. The diagnostic system of claim 4, wherein the first microcontroller obtains the second initialization value and the first battery module fault line voltage flag value by reading a second table stored in the memory device; the second table being associated with the battery module; the second table having the second initialization value and the first battery module fault line voltage flag value therein.

6. The diagnostic system of claim 5, wherein:
the second microcontroller further having a first voltage comparator therein which is electrically coupled to the first battery cell; and
the first voltage comparator setting the first comparator bit equal to the first fault value if the first output voltage of the first battery cell is greater than the first threshold voltage value.

7. The diagnostic system of claim 6, wherein:
the second microcontroller operably communicating with the first microcontroller utilizing a communication bus;
the second microcontroller sending the first comparator bit to the first microcontroller utilizing the communication bus.

8. The diagnostic system of claim 7, wherein:
the first microcontroller further includes an analog-to-digital converter that measures the battery module fault line voltage on the fault line coupled to and between the first and second microcontrollers; the analog-to-digital converter generating the battery module fault line voltage value based on the battery module fault line voltage.

9. The diagnostic system of claim 5, wherein:
the memory device further includes third and fourth tables stored therein; the third table having a first battery module number associated with the battery module;
the first microcontroller reading the third table to obtain the first battery module number;
the first microcontroller storing the first battery cell comparator overvoltage flag and the first battery module number in a first record in the fourth table.

10. The diagnostic system of claim 9, wherein the first record in the fourth table has the first battery module number appended to an end of the first battery cell comparator overvoltage flag value.

11. The diagnostic system of claim 1, wherein:
the first microcontroller initializing second and third battery cell comparator overvoltage flags to the first initialization value;
the first microcontroller receiving second and third comparator bits from the second microcontroller; the second comparator bit having the first fault value if a second output voltage of the second battery cell is greater than the first threshold voltage; the third comparator bit having the first fault value if a third output voltage of the third battery cell is greater than the first threshold voltage;
the first microcontroller setting the second battery cell comparator overvoltage flag equal to a second battery cell comparator overvoltage flag value if the second comparator bit is equal to the first fault value;
the first microcontroller setting the third battery cell comparator overvoltage flag equal to a third battery cell comparator overvoltage flag value if the third comparator bit is equal to the first fault value; and
the first microcontroller transitioning the contactor to the open operational state if the second battery cell comparator overvoltage flag is equal to the second battery cell comparator overvoltage flag value or the third battery cell comparator overvoltage flag is equal to the third battery cell comparator overvoltage flag value.

12. The diagnostic system of claim 11, wherein:
the first microcontroller setting the battery module fault line voltage flag equal to the first battery module fault line voltage flag value if the battery module fault line voltage value is equal to the fault voltage value indicating an overvoltage condition in at least one of the second and third battery cells in the battery module.

* * * * *